United States Patent
Knitel

(10) Patent No.: US 7,703,383 B2
(45) Date of Patent: Apr. 27, 2010

(54) CAPPUCCINO PREPARATION

(75) Inventor: Joseph Theodoor Knitel, Utrecht (NL)

(73) Assignee: Sara Lee/DE N.V., Utrecht (NL)

( * ) Notice: Subject to any disclaimer, the term of this patent is extended or adjusted under 35 U.S.C. 154(b) by 851 days.

(21) Appl. No.: 10/807,216

(22) Filed: Mar. 22, 2004

(65) Prior Publication Data

US 2004/0241307 A1 Dec. 2, 2004

Related U.S. Application Data

(63) Continuation of application No. PCT/NL02/00614, filed on Sep. 23, 2002.

(30) Foreign Application Priority Data

Sep. 21, 2001 (NL) .................................. 1019013

(51) Int. Cl.
*A47J 31/06* (2006.01)
(52) U.S. Cl. ..................... 99/302 R; 99/295
(58) Field of Classification Search ............... 99/295, 99/302 R, 287, 316, 323.3
See application file for complete search history.

(56) References Cited

U.S. PATENT DOCUMENTS

| 3,450,024 A | * | 6/1969 | Martin | ..................... 99/295 |
| 5,150,645 A | | 9/1992 | Schiettecatte | |
| 5,913,962 A | * | 6/1999 | Gasser et al. | ............... 99/293 |
| 6,009,792 A | * | 1/2000 | Kraan | ..................... 99/295 |
| 6,748,850 B1 | * | 6/2004 | Kraan | ................... 99/289 R |

FOREIGN PATENT DOCUMENTS

| DE | 40 37 366 A1 | 5/1992 |
| DE | 42 13 895 A1 | 11/1992 |
| DE | 4424835 | 1/1996 |
| EP | 0904717 | 9/1998 |
| GB | 989996 | 4/1965 |
| JP | 11-120434 | 4/1999 |
| NL | 7215523 | 5/1974 |
| NL | 1013270 | 4/2001 |
| WO | WO 89/12416 A2 | 12/1989 |
| WO | WO 2004/056246 A1 | 7/2004 |

* cited by examiner

*Primary Examiner*—Reginald L Alexander
(74) *Attorney, Agent, or Firm*—Foley & Lardner, LLP

(57) ABSTRACT

Method for preparing cappuccino wherein at least one coffee pad filled with ground coffee and an instant and/or liquid creamer are utilized, the method further comprising the following method-steps: hot water is forced under pressure through the coffee pad for obtaining coffee extract;—the coffee extract is supplied under pressure to at least one nozzle for obtaining a coffee extract jet, the coffee extract jet is aimed at a first buffer reservoir already filled with the creamer so that in the first buffer reservoir the cappuccino is formed and the cappuccino is discharged from the first buffer reservoir.

13 Claims, 4 Drawing Sheets

CAPPUCCINO PREPARATION

CROSS-REFERENCE TO RELATED APPLICATIONS

The present application is a continuation of International Patent Application Serial No. PCT/NL02/00614 filed on Sep. 23, 2002; which claimed priority to The Netherlands Application Serial No. NL1019013 filed on Sep. 21, 2001.

BACKGROUND

The invention relates to a method for preparing cappuccino wherein at least one coffee pad filled with ground coffee is utilized. The invention also relates to an apparatus for preparing a cappuccino.

A method for preparing cappuccino is known per se. With this method, first, with au apparatus known per se, a coffee extract is made which is collected in, for instance, a cup. Then, with the aid of further means known per se, hot milk with a fine-bubble froth layer is prepared. This hot milk with fine-bubble froth layer is added to the coffee extract in the cup whereupon the cappuccino is ready. The known method has as a drawback that it is laborious and takes up relatively much time.

The invention contemplates providing a solution to this problem.

BRIEF SUMMARY OF THE INVENTION

The method for preparing a cappuccino according to the invention utilizes at least one coffee pad filled with ground coffee, and an instant or liquid creamer, the method comprising the allowing method-steps:—hot water is forced under pressure through the coffee pad for obtaining coffee extract;—the coffee extract is fed under pressure to at least one nozzle for obtaining a coffee extract jet, the coffee extract let is aimed at a first buffer reservoir which is already filled with the creamer so that in the first buffer reservoir the cappuccino is formed, and the cappuccino is discharged from the first buffer reservoir.

As preparing the coffee extract and obtaining a foamed milky layer on the coffee extract is carried out in one and the same method, all this can be realized very rapidly and easily.

In particular, it applies that the cappuccino flowing from the first buffer reservoir is supplied to an impact surface while, after the cappuccino has flowed onto the impact surface, the cappuccino is discharged for consumption. What can thus be avoided is that, when the impact surface is at least substantially horizontal, the creamer, which has possibly been brought into the first buffer reservoir, before the method is started, ends up in a cup along the same path along which, during execution of the method, the cappuccino formed in the first buffer reservoir is transported from the buffer reservoir to the cup. The fact is that if a small amount of liquid creamer or an instant creamer were to flow from the buffer, this would fall on the impact surface and would remain lying here.

In particular, it applies here that the impact surface is formed by a bottom of a second buffer reservoir which is also filled with the cappuccino, while the cappuccino is discharged from the second buffer reservoir for consumption.

The apparatus according to the invention for preparing cappuccino is provided with a holder having an inlet and an outlet, while, in use, the holder is filled with ground coffee, the apparatus being further provided with hot water means for supplying hot water under pressure to the inlet of the holder so that the hot water is forced through the ground coffee for obtaining a coffee extract, at least one nozzle which is in fluid communication with the outlet for generating a coffee extract jet, and a first buffer reservoir which, in use, is filled with an instant and/or liquid creamer, the first buffer reservoir being positioned relative to the at least one nozzle such that the coffee extract jet spouts into the first buffer reservoir thereby forming the cappuccino, the first buffer reservoir being provided with at least one first outflow path for discharging the cappuccino from the first buffer reservoir, while the apparatus is further provided with an impact surface positioned relative to the first buffer reservoir such that the cappuccino flowing from the first buffer reservoir impacts on the impact surface before leaving the apparatus. With such an apparatus, the cappuccino can be promptly prepared.

In particular, it applies that the impact surface forms part of a second buffer reservoir which is provided with at least one second outflow path for discharging the cappuccino from the second buffer reservoir for consumption.

Preferably, it applies that the first buffer reservoir is removably arranged in the apparatus. This has as an advantage that to a known apparatus, as described in the Dutch patent application 1013270, only the first buffer reservoir needs to be added so as to make it possible to prepare a cappuccino with the known apparatus. The first buffer reservoir is then placed above the second, existing buffer reservoir. Preferably, it applies that the first buffer reservoir has a bottom which is smaller than a bottom of the second buffer reservoir. Consequently, the first buffer reservoir can simply overflow while the cappuccino formed in the first buffer reservoir ends up directly in the second buffer reservoir. Preferably, the first buffer reservoir can be formed by an opened, disposable cup filled with a creamer, or by a refillable holder. The fist outflow path of the first buffer reservoir can further be provided with at least one opening arranged in the bottom of the first buffer reservoir. In the case where the bottom of the first buffer reservoir is smaller than the bottom of the second buffer reservoir, this opening can always be located above the second buffer reservoir, so that the second buffer reservoir can collect the cappuccino from the first buffer reservoir. If, prior to the preparation of cappuccino, creamer present in the first buffer reservoir were to fall via the opening into the second buffer reservoir, it will remain lying here until it dissolves in cappuccino supplied from the first buffer reservoir to the second buffer reservoir. This prevents that creamer ends up in a cup in undissolved form.

BRIEF DESCRIPTION OF THE SEVERAL VIEWS OF THE DRAWINGS

The invention will now be further elucidated with reference to the drawing. In the drawing:

FIG. 1a shoves a side view of an apparatus according to the invention;

FIG. 1b shows, in perspective, a view of a holder receiving unit of the apparatus according to FIG. 1a;

FIG. 1d shows a cross section of the holder receiving unit along to the line 1d of FIG. 1a;

FIG. 2b shows a cross section of the coffee holder along the line 2b of FIG. 2a;

FIG. 2e shows a detail of an encircled part of FIG. 2b;

FIG. 3b shows a top plan view of the first buffer reservoir according to FIG. 3a.

DETAILED DESCRIPTION OF THE INVENTION

Figure 1E:
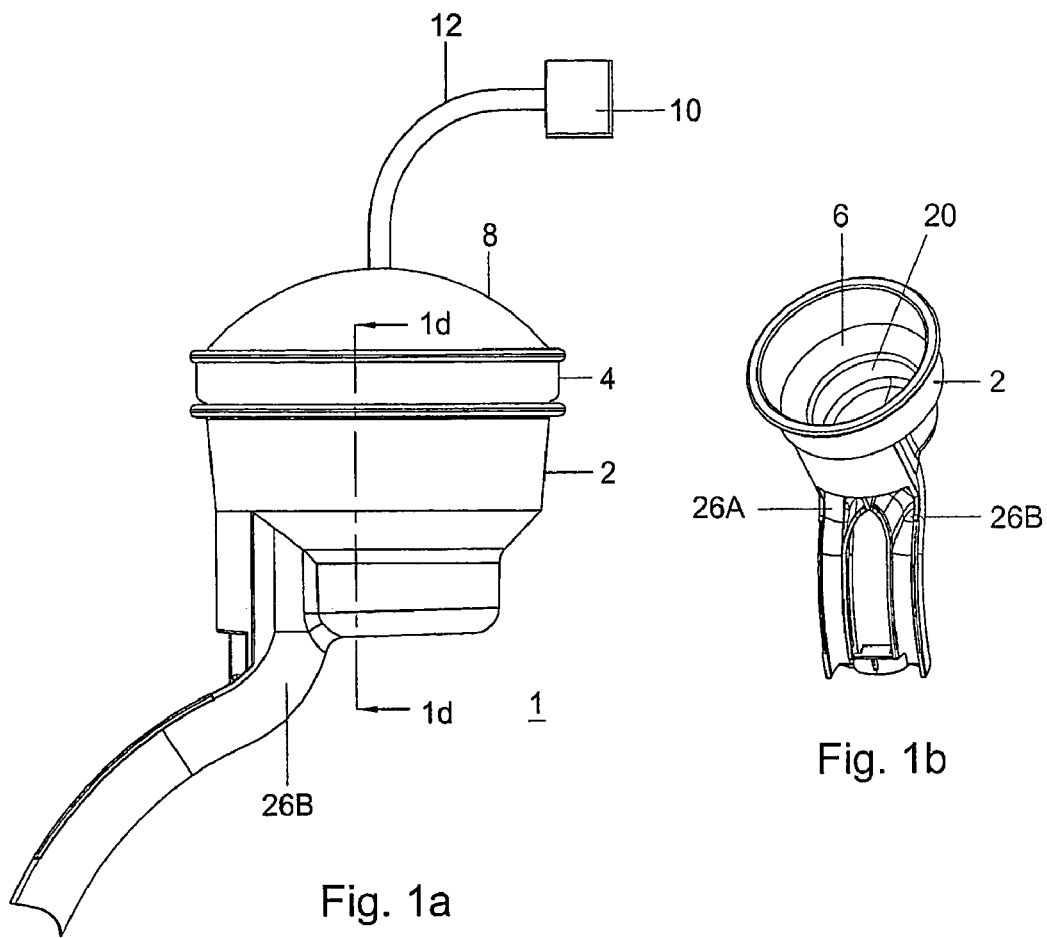
FIG. 1e shows a cross section along the line 1e of FIG. 1c of the holder receiving unit without a first buffer reservoir and with the coffee holder of FIGS. 2a and 2b placed thereon.
Figure 1E:
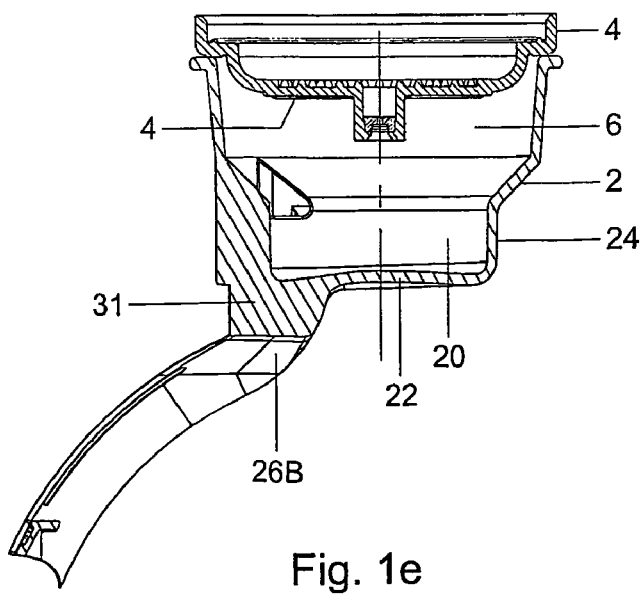
Figure 2A:
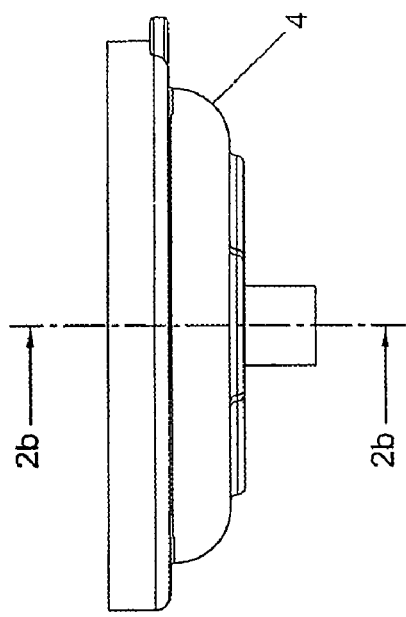
FIG. 2a shows the placed coffee holder of FIG. 1e.
Figure 2C:
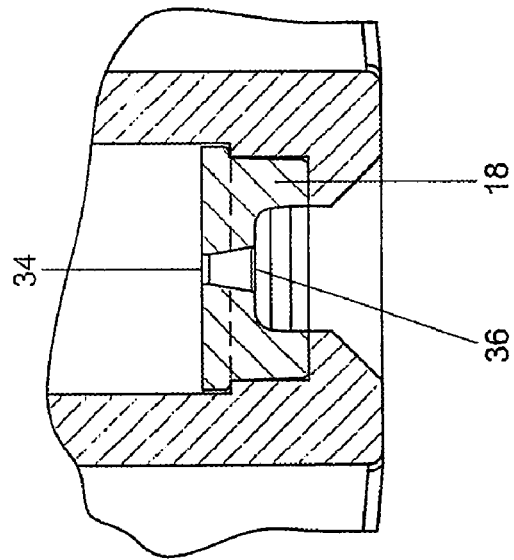

In FIG. 1a, with reference numeral 1, an apparatus for preparing a cappuccino with a milky fine-bubble froth layer is shown. The apparatus is provided with a holder receiving unit 2 in which a removable coffee holder 4 as shown in FIG. 2a is included. The coffee holder 4 rests on the holder receiving unit 2 and, with it underside, reaches into the holder receiving unit 2 (see FIG. 1e). In FIG. 1b, in perspective, the holder receiving unit 2 is shown. As is apparent from this Figure, the holder Receiving unit 2 is provided with a receiving space 6, in which, in use, the coffee holder 4 can be received.

The apparatus is further provided with a removable lid 8 with which the holder receiving unit 2 can be closed off when the coffee holder 4 is placed in the receiving space 6. In this example, the lid 8 is contiguous to the coffee holder 4 and the coffee holder 4 closes off the holder receiving unit. The lid 8 is detachably fluid-tightly connected to the coffee holder 4. The apparatus further comprises a hot water unit 10 arranged for supplying, via a tube 12, hot water under pressure to the coffee holder 4 closed off by the lid 8.

The coffee holder 4 is designed to be filled with ground coffee. In this example, the coffee holder 4 is provided with a bottom 14 on which a coffee pad filled with ground coffee can be placed. The bottom can for instance be designed as described in European patent 0 904 717 B1.

The bottom 14 is further provided with an outflow opening 16 in which a nozzle 18 is received. Preferably, the nozzle 18 is manufactured from a rigid material. Here, for instance, a hard plastic or a metal can be involved.

Figure 1C:
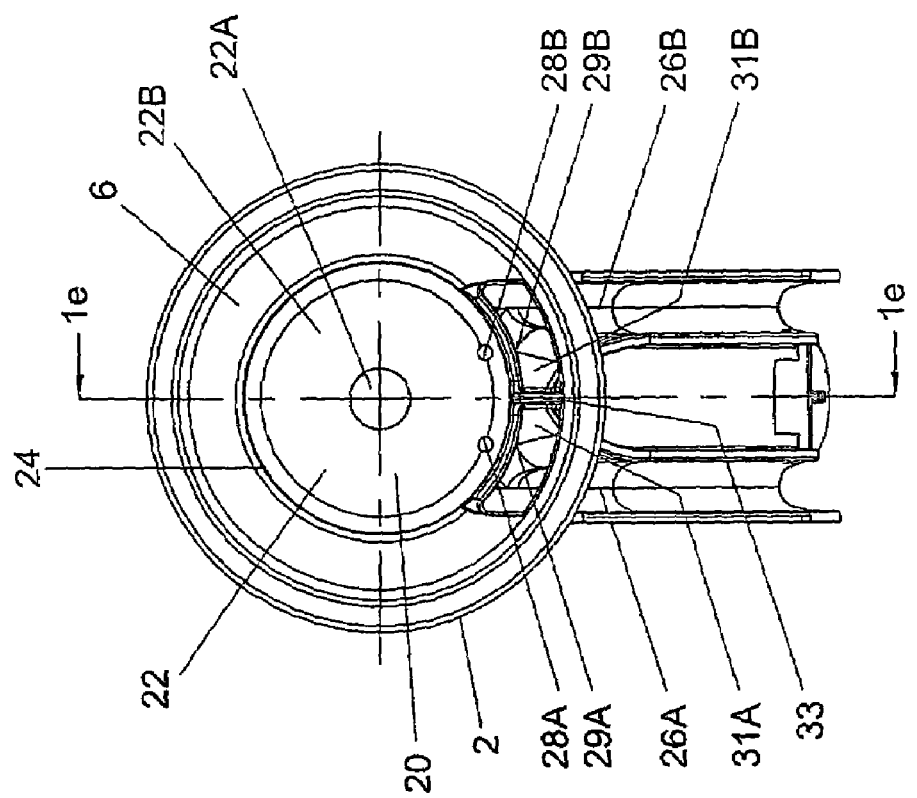
FIG. 1c shows a top plan view of the holder receiving unit according to FIG. 1b.
Figure 1D:
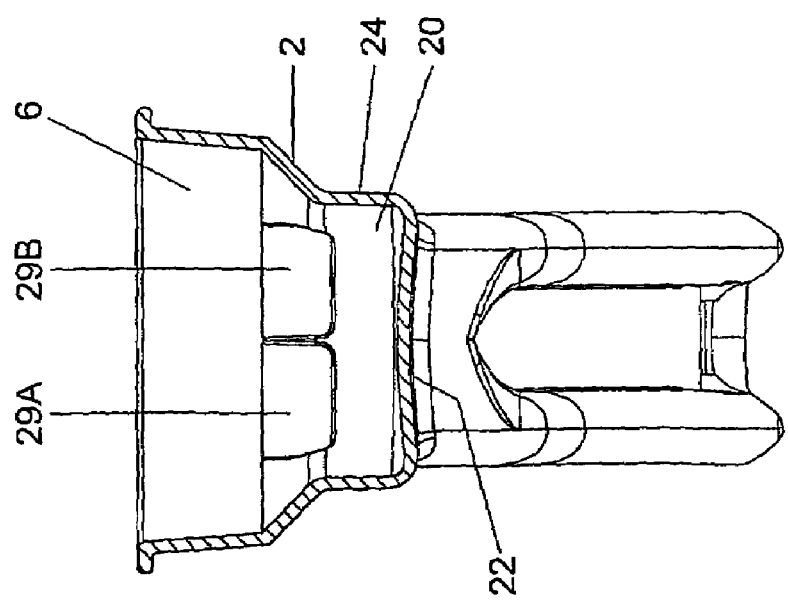

The holder receiving unit 2 is further provided with a second buffer reservoir 20 provided with, viewed from above, a substantially convex bottom 22 and upstanding sidewalls 24. The bottom 22 constitutes an impact surface 22. However, near the center of the bottom, the bottom is of substantially flat design. In FIG. 1c, the flat part of the bottom is indicated with reference numeral 22a, while the convex part is indicated with reference numeral 22b. In this example, at the bottom of the receiving space 6, below the bottom 22 of the second buffer reservoir 20, two outlets 26a and 26b are situated, for dispensing the cappuccino with the fine-bubble froth layer (see FIG. 1c). Further, in the bottom 22 of the second buffer reservoir, two further openings 28a and 28b are included. These openings 28a and 28b are located at a low, and in this example, the lowest level of, viewed from above, the convex bottom 22. The coffee holder 4, the nozzle 18 and the second buffer reservoir 20, respectively, are therefore included in succession in a liquid flow path extending from the hot water unit 10 to the outlets 26a, 26b.

Figure 1F:
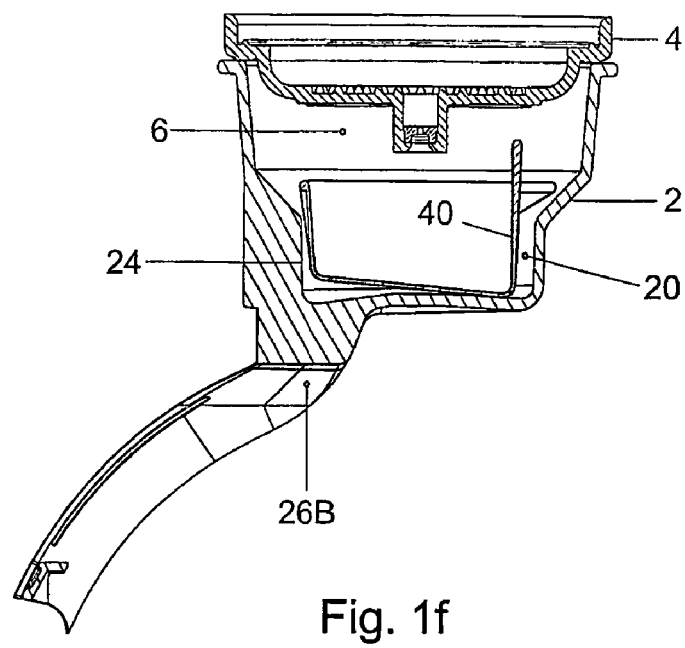
FIG. 1f shows a cross section along the line 1e of FIG. 1e of the holder receiving unit with the coffee holder and wherein the first buffer reservoir is arranged in the second buffer reservoir.
Figure 3B:
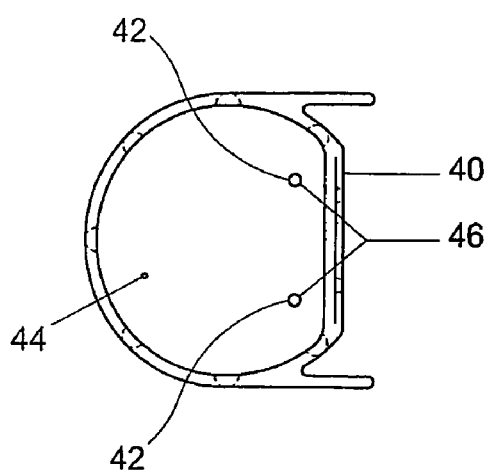
Figure 3A:
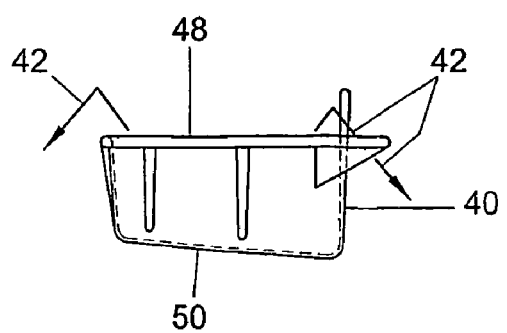
FIG. 3a shows a side view of a possible embodiment of the first buffer reservoir according to the invention.

The apparatus is further provided with a first buffer reservoir 40, as shown in FIGS. 3a and 3b. Prior to use, this first buffer reservoir is filled with an instant and/or liquid creamer. This can be both a dairy and a non-dairy creamer. The first buffer reservoir 40 is placed in the holder receiving unit 2 above the second buffer reservoir 20. This arrangement is shown in FIG. 1f. In this example, the first buffer reservoir rests on the bottom 22 of the second buffer reservoir. This is, however, not required. The first buffer reservoir can also be clampingly received between the upstanding sidewalls 24 of the second buffer reservoir at a distance above the bottom 22. Then, the coffee holder 4 is placed in the holder receiving unit 2 (see FIG. 1f). The first buffer reservoir 40 is positioned relative to the at least one nozzle 18 such that, in use, a coffee extract jet spouts from the nozzle 18 into the first buffer reservoir. The first buffer reservoir 40 is further provided with a first outflow path 42 for discharging cappuccino which is formed in the first buffer reservoir. This first outflow path 42 is arranged such that from the first buffer reservoir 40 cappuccino is supplied to the second buffer reservoir 20. In this example, the bottom 22 of the buffer reservoir also constitutes an impact surface positioned relative to the first buffer reservoir such that the cappuccino flowing from the first buffer reservoir impacts on the impact surface before leaving the apparatus.

The operation of the apparatus is as follows. In the coffee holder 4, a coffee pad 80 is arranged. This can be a coffee pad 30 as described in European patent EP 0 904 717.

The coffee holder 4 and the coffee pad together form the assembly described in this European patent.

Figure 2B:
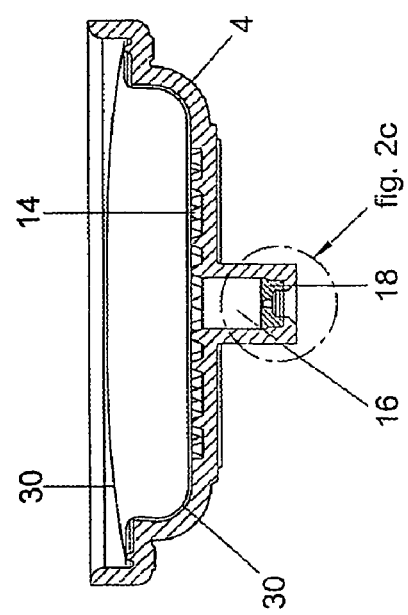

The first buffer reservoir is filled with the creamer and the first buffer reservoir is placed in the holder receiving unit 2 as shown in FIG. 1f. Then, the coffee holder 4, filled with the coffee pad 30, is placed in the holder receiving unit 2 as shown in FIG. 1f. Thereafter, the lid 18 is placed on the holder receiving unit 2 such that the lid 18 closes off the coffee holder as shown in FIG. 1a. Hereupon, the hot water unit 10 will supply hot water via the tube 12 to the receiving space 6. The pressure then arising can, for instance, be approximately 0.4 bar. Hence, the hot water is supplied to an upper side of the coffee holder and is forced through the coffee pad 30 (the coffee pad is schematically shown in FIG. 2b and indicated with reference numeral 30). Then, in the coffee pad 30, coffee extract is formed. This coffee extract will leave the underside of the coffee pad and flow along the bottom of the coffee holder to the outflow opening 16. In the outflow opening 16, the coffee extract proceeds to flow to the nozzle 18. The nozzle 18 ensures that the coffee extract spouts from the nozzle 18. Thus, from the nozzle, a coffee extract jet is generated which spouts into the first buffer reservoir 40, hereby, firstly, striking the creamer present in the first buffer reservoir, and also a bottom 44 of the first buffer reservoir 40. As a result of the impact on the bottom 44, also, air is beaten into the coffee extract. At the same time, the creamer will start to dissolve in the coffee exact. At this point already, a fine-bubble milky froth layer will start to be formed. Then, the first buffer reservoir 40 starts to fill up slowly. The result is that the coffee extract jets impacts on the liquid surface of the coffee extract already present in the first buffer reservoir 40. Even more air will then be beaten-in so that even more milky froth is formed so that, thus, a cappuccino is formed. When the first buffer reservoir 40 is full, it will overflow. This overflowing forms a part of the first outflow path 42. In this example, the first buffer reservoir 40 is placed above the second buffer reservoir 20. Moreover, the first buffer reservoir 40 has a bottom 44 which is smaller than the bottom 22 of the second buffer reservoir 20. This has as a result that when the first buffer reservoir overflows the cappuccino ends up in the second buffer reservoir 20 which will be filled with cappuccino. When the liquid level in the second buffer reservoir has sufficiently risen, this cappuccino will flow via the two outflow openings 29a, 29b arranged in the sidewall 24 of the buffer reservoir to the outlets 26a 26b, respectively, to leave the holder receiving unit 2. A lowest point of the outflow openings 29a and 29b is located above the level of the bottom 22 near the sidewall 24 of the second buffer reservoir. Hence, the cappuccino flowing from the second buffer reservoir will flow to a position at the bottom of the receiving unit 2. This position is below the bottom 22 of the second buffer reservoir 20. As stated, at the bottom of the holder, the outlets 26a, 26b are included via which the cappuccino with fine-bubble milky froth layer can leave the holder unit 2 to be collected in, for instance, one or two cups. Here, the outflow openings 29a, 29b and the outlets 26a, 26b form a second outflow path for discharging the cappuccino from the second buffer reservoir for consumption.

In the first buffer reservoir, two further openings 46 are arranged which, after the hot water supply unit has dispensed the desired amount of hot water, provide that the first buffer reservoir 40 can drain via these openings into the second buffer reservoir 20. These openings 46 also form part of the above-mentioned first outflow path 42 of the first buffer reservoir 40.

Likewise, in the bottom 22 of the second buffer reservoir 20, the outflow openings 28a, 28b are arranged, ensuring that the second buffer reservoir drains completely after the supply of coffee extract to the second buffer reservoir has cease. The outflow openings 28a, 28b are arranged such that via these openings the cappuccino can be supplied to the outlets 26a, 26b, respectively. The outflow openings 28a and 28b too form part of the above-mentioned second outflow path.

The apparatus described up to this point substantially corresponds with the apparatus as described in Dutch patent application 1013270, the difference being that with this latter apparatus, the first buffer reservoir 40, which, in use, is filled with water, is not present.

If the first buffer reservoir is left out, the coffee extract jet generated with the nozzle 18 will, in use, spout directly into the second buffer reservoir and coffee with a fine-bubble froth layer will be formed as described in the Dutch patent application 1013270. The bottom 22 of the second buffer reservoir then serves as impact surface. Directly after the coffee extract jet has started, it will impact on the second impact surface 22 so that air is beaten into the coffee so that coffee with a fine-bubble froth layer is formed. Hereupon, the second buffer reservoir will start to fill so that the jet of coffee extract impacts on the coffee extract already present in the second buffer reservoir. As a result, even more air will be beaten into the coffee extract. The coffee extract with the fine-bubble froth layer can leave the second buffer reservoir via the outflow openings 29a and 29b and the outflow openings 28a and 28b.

Preferably, the first buffer reservoir can be formed by a refillable holder or an opened, disposable cup filled with creamer. The disposable cup is then closed off at upper side 48 with a removable foil. This foil can be removed for opening the cup at its upper side 48 so that the first buffer reservoir 40 is formed as shown in the FIGS. 8a, 3b. Also, a removable foil can be arranged at the underside 50 of the disposable cup for closing off the openings 46. This foil too is then to be removed for making the first buffer reservoir 40 ready for use. The disposable cup is then arranged to be placed on top of the second buffer reservoir 20 such that the first outflow path 42 terminates in the second buffer reservoir 20. Therefore, the invention is embodied both in the apparatus as such and in the disposable cup as such. It is essential that the disposable cup can be fittingly arranged on or in the second buffer reservoir so that the first outflow path of the disposable cup terminates in the second buffer reservoir.

The invention is not limited in any way to the embodiments outlined hereinabove. For instance, the second buffer reservoir 20 can be replaced by the impact surface 22 alone. This can be formed by the bottom 22 of the second buffer reservoir 20 while the upstanding sidewall 24 of the second buffer reservoir 20 is left out. The impact surface 22 can then serve to prevent coffee creamer possibly ending up via the openings 46 of the first buffer reservoir on the impact surface 22, from not directly finishing up in a cup via the outlets 26a and 26b. The creamer (certainly when it is in powder form) will then remain lying on the impact surface 22 until it is flushed away by (an excess of) cappuccino which is formed in the first buffer reservoir and which then ends up on the impact surface 22. In case the second buffer reservoir 20 is used and is filled with cappuccino, the upstanding sidewalls 24 therefore have no functional meaning. Only the impact surface 22 then serves to prevent, before the hot water unit is started, coffee creamer from ending up in a cup in undissolved form, via the first outflow path end the outlets 26a, 26b. The upstanding sidewalls 24 of the second buffer reservoir 20 do have a functional meaning when the first buffer reservoir is left out for preparing coffee with a fine-bubble froth layer as discussed hereinabove. However, it is also possible to leave out the upstanding sidewalls for preparing coffee with a fine-bubble froth layer while the first buffer reservoir is also left out. In that case, air is beaten into the coffee extract by impact of the coffee extract jet on the impact surface. The impact surface 22 does not need to be placed horizontally because air is already beaten into a jet of coffee extract upon impact on this impact surface. Preferably, the impact surface 22 is then of roughened design. Naturally, when preparing cappuccino, such a slopingly arranged impact surface 22 cannot retain creamer which leaves the first buffer reservoir prematurely. In all cases, therefore, the upstanding sidewalls of the second buffer reservoir can be left out so that only the impact surface 22 remains. The impact surface is then connected to the rest of the holder receiving unit in a different manner, for instance with supporting arms.

When in this application a nozzle is mentioned, any spout opening suitable for generating at least one liquid jet is meant.

The coffee holder can also consist of a small cup of, for instance, metal with a filter bottom so that the coffee holder can be filled with loose coffee. The coffee holder can also be filled with refillable coffee pads. These coffee pads are, for instance, manufactured from a washable filter material such as a metal or plastic.

As already stated, the first buffer reservoir can also be clampingly received between the upstanding sidewalls 24 of the second buffer reservoir. As the first buffer reservoir at its outside does not entirely abut against the upstanding sidewall the cappuccino can still flow to the bottom 22 upon overflow of the first buffer reservoir.

Also when the first buffer reservoir rests on the bottom 22, it can be clampingly received between the upstanding sidewalls 24 of the second buffer reservoir. Thus, if one so wishes, the first buffer reservoir can be prevented from floating in the second buffer reservoir. The creamer can be both an instant and a liquid creamer. Such variants are all understood to fall within the scope of the invention.

The invention claimed is:

1. An apparatus for the preparation of a cappuccino from a coffee extract and an instant and/or liquid creamer, the apparatus comprising:
   a holder with an inlet and an outlet wherein, in use, the holder is filled with ground coffee,
   a hot water supply unit for supplying hot water under pressure to the inlet of the holder so that the hot water is forced through the ground coffee for obtaining a the coffee extract,
   at least one nozzle which is in fluid communication with the outlet for generating a coffee extract jet, and a first buffer reservoir which, in use, is filled with the creamer, a second buffer reservoir having a bottom and upstanding sidewalls, wherein the first buffer reservoir is positioned at least partially in the second buffer reservoir relative to the at least one nozzle such that the coffee extract jet spouts into the first buffer reservoir so that the cappuccino is formed, wherein the first buffer reservoir is not permanently connected to the second buffer reservoir and is readily removable from, and replaceable in, the second buffer reservoir as a separate unit.

2. The apparatus according to claim 1, wherein the first buffer reservoir includes at least one first outflow path for discharging the cappuccino from the first buffer reservoir, and the second buffer reservoir includes an impact surface and at least one second outflow path for discharging the cappuccino from the second buffer reservoir for consumption.

3. The apparatus according to claim 2, wherein the first buffer reservoir is placed above the second buffer reservoir.

4. The apparatus according to claim 3, wherein the first buffer reservoir has a bottom which is smaller than a bottom of the second buffer reservoir.

5. The apparatus according to claim 4, wherein the first buffer reservoir is formed by an opened disposable cup filled with the creamer or a refillable holder which is filled with the creamer.

6. The apparatus according to claim 5, wherein the first outflow path comprises an opening in a bottom of the first buffer reservoir.

7. The apparatus according to claim 5, wherein the disposable container or the refillable holder is arranged to be positioned on top of the second buffer reservoir such that the first outflow path terminates in the second buffer reservoir.

8. The apparatus according to claim 7, wherein the holder is designed to be filled with a coffee pad.

9. A disposable cup of the assembly according to claim 7.

10. A refillable holder of the assembly according to claim 7.

11. The apparatus according to claim 1, wherein the first buffer reservoir rests on a bottom of the second buffer reservoir.

12. The apparatus according to claim 1, wherein the first buffer reservoir is clampingly received between the upstanding sidewalls of the second buffer reservoir at a distance above the bottom of the second buffer reservoir.

13. An apparatus for the preparation of a beverage from a coffee extract and a creamer, the apparatus comprising:

a holder having an inlet and an outlet wherein, in use, the holder contains ground coffee, a hot water supply unit configured to supply hot water under pressure to the inlet of the holder so that the hot water is forced through the ground coffee to obtain the coffee extract, at least one nozzle in fluid communication with the outlet of the holder and configured to generate a coffee extract jet, and a first buffer reservoir having a convex bottom wall and upstanding sidewalls wherein, the first buffer reservoir in use, is filled with the creamer and receives the coffee extract jet, a second buffer reservoir having an angled bottom wall and upstanding sidewalls, the angled bottom having an upper end and a lower end, the lower end having at least one outflow in communication with the first buffer reservoir, wherein the first buffer reservoir is positioned at least partially in the second buffer reservoir below the at least one nozzle and is readily removable from, and replaceable in, the second buffer reservoir as a separate unit.

* * * * *